United States Patent Office 2,772,235
Patented Nov. 27, 1956

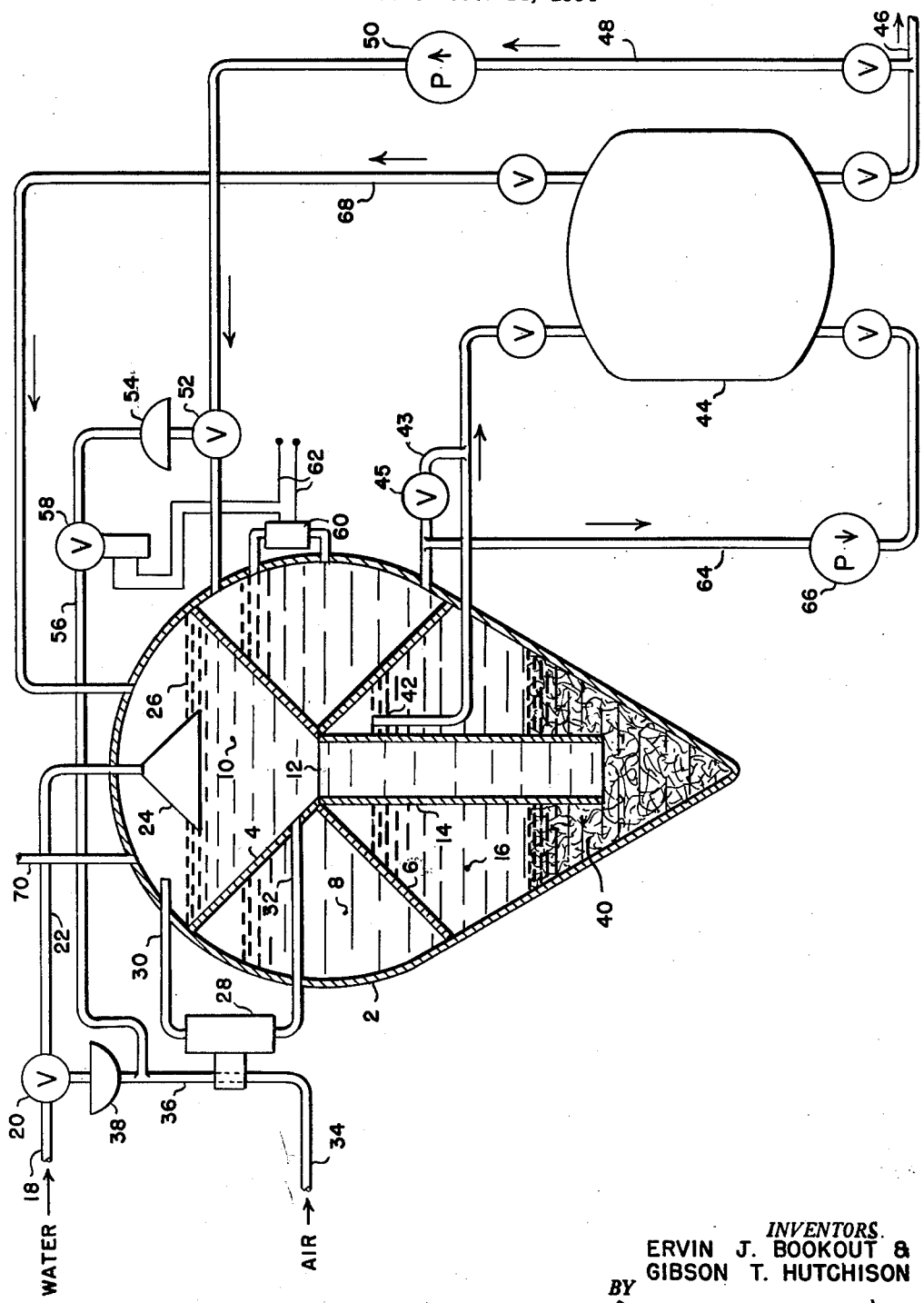

2,772,235

LIQUID TREATMENT APPARATUS

Ervin J. Bookout and Gibson T. Hutchison, Abington, Pa., assignors to Cochrane Corporation, Philadelphia, Pa., a corporation of Pennsylvania Application October 14, 1954, Serial No. 462,232

3 Claims. (Cl. 210—16)

This invention relates to liquid treatment apparatus and, more specifically, to liquid treatment apparatus including a pair of liquid treatment tanks in serial arrangement in which provision is made to accommodate backwash return from the second treatment tank to the first treatment tank without the necessity of providing an intermediate storage tank and without overloading the treatment zone of the first treatment tank.

The present invention may be readily understood when considered in conjunction with apparatus for treating water for the removal of hardness, alkalinity, turbidity and in which untreated water is passed through a sludge bed in a first treatment tank. The water thus treated is then passed to a second treatment tank which may be a filter bed or may be a treatment tank containing zeolites or the like. At regular intervals it is necessary that the filter or zeolite tank be reverse flushed and, in some cases, otherwise treated to restore the operational efficiency of the material involved in the tank. The reverse flush is conventionally carried out by the use of treated liquid in order that the liquid remaining in the treatment tank after the reverse flush is suitable for delivery as treated liquid.

The reverse flush of filter or zeolite beds is attended by the problem of providing treated liquid by which the flush is accomplished and of providing a suitable receptacle to receive the liquid and the materials carried therewith out of the filter or zeolite bed while the reverse flush is in progress. The provision of a separate compartment into which the reverse flush liquid is delivered involves not only the cost in equipment and space required for the reverse flush receptacle, but also involves the loss of heat when the softening process is a hot process such as is generally desirably employed in systems for the removal of undesirable substances contained in the water.

It is the primary object of this invention to provide liquid treatment apparatus in which the discharge from the reverse flush of filter or zeolite beds may be delivered directly to the first stage treatment tank, thus avoiding the necessity for providing separate reverse flush liquid receiving compartment and avoiding the heat loss and other attendant disadvantages of such an arrangement.

This principal and other subsidiary objects of the invention will become apparent from the following description when read in conjunction with the accompanying drawing in which there is diagrammed a preferred type of apparatus for carrying out the invention.

The apparatus includes a first treatment tank 2 within which there is mounted a first wall 4 in the form of an inverted truncated cone in which the base of the cone is connected to the top portion of the tank 2 and a second wall 6 in the form of an upstanding truncated cone in which the base of the cone is connected to the lower portion of the tank 2. The top of the cone 6 joins the top of the cone 4. The two cones and the intermediate portion of the tank 2 provide a storage compartment 8. Within the upper conical wall 4 there is provided a compartment 10. The opening 12 formed at the apices of the truncated conical walls 4 and 6 supports the upper end of a downwardly extending tube 14. The opening 12 and the tube 14 provide communication between the upper compartment 10 and a lower treatment compartment 16 provided within the tank 2 below the lower conical wall 6.

Water to be treated is supplied through a suitable pipe line 18, through an inlet control valve 20 and pipe line 22 to a diffuser 24 in the top of the compartment 10.

The level 26 of the liquid in the compartment 10 is maintained by means of a level controller 28 which is connected to the compartment 10 by means of lines 30 and 32. A supply of air or other control medium under pressure is connected to the level controller at 34. Compressed air output from the controller at 36 is controlled in response to the liquid level 26 in the compartment 10 and is connected to a diaphragm control mechanism shown diagrammatically at 38 for controlling the inlet valve 20. This type of level controller mechanism is known in the art and need not be described in detail herein. It is sufficient to note that the valve 20 is closed down as the level in the compartment 10 increases and is shut off completely when the level in the compartment 10 has reached an upper limit as determined by the controller and conversely is fully open when the liquid level has reached a lower limit as determined by the controller.

Liquid from the compartment 10 passes downwardly through the tube 14 into the lower treatment compartment 16 in the treatment tank 2. The lower portion of this compartment is of conical form and contains a sludge bed 40, the upper level of which is above the lower end of the tube 14. Thus the liquid passing downwardly through the tube 14 rises in the treatment compartment 16, passing upwardly through the sludge bed at a decreasing rate of speed as the cross sectional area of the treatment compartment increases and ultimately is discharged from the treatment compartment through pipe line 42.

The partially treated liquid passing through the pipe line 42 is delivered to a second treatment tank 44. This tank may contain, for example, a filter bed, a zeolite bed or a combination of both or a similar bed requiring intermittent backwash. The fully treated liquid is discharged from the tank 44 through pipe line 46.

A pipe line 48 is connected between the treated liquid pipe line 46 and the treated liquid compartment 8 in the first treatment tank. A pump 50 may be provided in the pipe line 48 in order to insure proper circulation of liquid. A control valve 52 is provided in the pipe line 48 in order to control the flow of liquid therethrough. The control valve 52 is positioned by means of a conventional diaphragm control, as indicated at 54, which is connected by means of pipe line 56 to the output line 36 of the level controller. The diaphragm arrangement 54 is such that the valve 52 is closed when the level 26 in the compartment 10 is at the minimum level as determined by the level controller and is opened to a maximum set opening when the level 26 is at the maximum value as determined by the level controller.

A supplementary valve 58 is provided in the pipe line 56 and is a conventional solenoid operated three-way valve serving to connect the diaphragm assembly 54 to the atmosphere in response to actuation of a float switch 60 in the treated liquid compartment 8. When the level in the compartment 8 reaches a predetermined value, the float switch 60 closes and a potential source connected across the conductors 62 is connected to the coil of the solenoid valve 58 actuating the valve to remove all air pressure from the diaphragm 54 and thus permitting the valve 52 to close off the line 48.

A pipe line 64 is connected between the lower portion of the compartment 8 and the output side of the treatment tank 44. A pump 66 may be connected in the pipe line 64 if desired. A pipe line 68 connects the input side of the treatment tank 44 with the compartment 10 in the top of the treatment tank. A steam line 70 is also connected to the top of the compartment 10. The steam serves to heat the liquid in the treatment tank and to maintain the liquid at the desired treating temperature. It will be evident that a plurality of treatment tanks 44 may be employed in parallel or in series connection.

In normal operation of the apparatus, water to be treated passes through the pipe line 18 and into the compartment 10. The proper level of liquid is maintained in the compartment 10 by operation of the level controller 28 and the valve 20 controlled thereby. It should be noted that if the liquid level 26 becomes too high in this compartment 10, the steam demanded by the compartment 10 through line 70 is cut off resulting in reduction or termination of steam consumption in the treating tank and the proper treatment temperature of the liquid cannot be maintained. The water admitted to the compartment 10 passes downwardly through the tube 14, upwardly through the sludge bed 40 and out through the pipe line 42 to the treatment tank 44. The partially treated liquid flows downwardly through the treatment tank 44 and the fully treated liquid passes out of a bottom of the treatment tank 44 and is discharged from the apparatus through pipe line 46. During this operation, treated liquid flows through the pipe line 48 to the storage compartment 8. This flow is continued until the compartment 8 is filled and the rate of flow is determined by the level of the liquid in the compartment 10 through operation of the controller 28 and the valve 52. Thus, if the liquid in the compartment 10 falls to a low level, the valve 52 is throttled down and the valve 20 is opened, thus reducing the rate of flow into the compartment 8 and increasing the rate of flow into the compartment 10. Conversely, when the liquid level 26 in the compartment 10 rises to a relatively high level, the valve 20 is throttled down and the valve 52 is opened. It will be evident that by proper selection of the response characteristics of the valves 52 and 20 and the level controller 28 the total load applied to the treating system can be governed so as not to unduly burden the system both with regard to the rate at which liquid passes through the two treatment tanks and with regard to the steam demand by the treatment system. The steam demand consideration is necessarily involved for the reason that many systems involve connections with power plant equipment in which relatively sudden changes in steam demand are desirably avoided. When the liquid level compartment 8 has reached a predetermined level as determined by the position of the float switch 60, the valve 58 is actuated serving to remove air pressure control from the diaphragm assembly 54 causing the valve to close off the pipe line 48.

When it becomes necessary to backwash the materials contained within the treatment tank 44, clear liquid is pumped from the compartment 8 upwardly through the treatment tank 44 and out of the treatment tank 44 through pipe line 68 to the top of the compartment 10. Thus treated liquid is used in the backwash and is returned to the treatment system for retreatment. This storage and recirculation is provided with only a minimum of heat loss and without the provision of separate storage vessels for receiving the backwash liquids from the treatment tank 44. As previously noted, there will generally be provided a plurality of treatment tanks 44 and thus the delivery of treated liquid through pipe line 46 need not be interrupted while one of the treatment tanks 44 is undergoing backwash. Furthermore, during the backwashing of one of the treatment tanks 44, the rate of input flow through pipe line 22 is controlled by the level controller 28 and the valve 20 as previously described. During and upon the completion of the backwash cycle, the compartment 8 may be resupplied with clear water through pipe line 48 as previously described.

It will be evident from the foregoing that the apparatus described provides means for accommodating backwash return without the provision of a physical compartment for this purpose and without overloading the treating system beyond a controlled volume of flow during the return of backwash water. The invention provides means for controlling the flow of clear water to the storage compartment at a rate inversely proportional to the demand on the system. Thus the output of the treating system cannot be adversely affected by the internal cycle by means of which backwash water is stored for subsequent use.

The apparatus eliminates the need for means for storing used reverse flush fluids, it maintains a relatively constant steam demand during all phases of its operation and has high volumetric efficiency. While the apparatus has been described in connection with one type of hot process sedimentation system, it will be evident that the invention may be employed in a sludge blanket type of system or in a downflow system and in such systems involving deaeration or non-deaeration.

While the more preferable arrangement involves the use of water treated in the treatment tank 44 for filling the storage compartment 8, it will be evident that under some conditions it may be desirable to employ water flowing from the chamber 16 to fill the storage compartment 8. To provide this flow a pipe line 43 is connected between the pipe lines 42 and 64 and a valve 45 is provided in the line 43 to control flow therethrough.

It will also be evident that while in the arrangement shown the tank 44 providing the second treatment compartment is physically separated from the tank 2, it is possible that the second treatment compartment provided by the tank 44 may be included within the shell of the tank 2 along with the storage compartment 8 of the first treatment compartment which is provided by the upper compartment 10 and the lower compartment 16.

What is claimed is:

1. Liquid treatment apparatus comprising a liquid treatment tank including a first liquid treatment compartment and a liquid storage compartment, means providing a second liquid treatment compartment, means for conducting liquid to be treated to said first treatment compartment, means for conducting treated liquid from said first treatment compartment to one side of said second treatment compartment, means for conducting additionally treated liquid from the other side of said second treatment compartment, means for conducting liquid from said other side of said second treatment compartment to said storage compartment, a flow control means in said last mentioned conducting means, means responsive to the liquid level in said first treatment compartment for positioning said flow control means, means for conducting liquid from said storage compartment to said other side of said second treatment compartment, and means for conducting liquid from said one side of said second treatment compartment to said first treatment compartment.

2. Liquid treatment apparatus comprising a liquid treatment tank including a first liquid treatment compartment and a liquid storage compartment, means providing a second liquid treatment compartment, means for conducting liquid to be treated to said first treatment compartment, a first flow control means in said last mentioned conducting means, means responsive to liquid level in said first treatment compartment for positioning said first flow control means, means for conducting treated liquid from said first treatment compartment to one side of said second treatment compartment, means for conducting additionally treated liquid from the other side of said second treatment compartment, means for conducting liquid from said other side of said second treatment compartment to said storage compartment, a second flow control means in said last mentioned conducting means, means responsive to the liquid level in said first treatment compartment for positioning said second flow control means, means for conducting liquid from said storage compartment to said other side of said second treatment compartment, and means for conducting liquid from said one side of said second treatment compartment to said first treatment compartment.

3. Liquid treatment apparatus comprising a liquid treatment tank including a first liquid treatment compartment and a liquid storage compartment, means providing a second liquid treatment compartment, means for conducting liquid to be treated to said first treatment compartment, means for conducting treated liquid from said first treatment compartment to one side of said second treatment compartment, means for conducting additionally treated liquid away from the other side of said second treatment compartment, means for conducting liquid from said other side of said second treatment compartment to said storage compartment, means for conducting liquid from the lower portion of said storage compartment to said other side of said second treatment compartment for draining said storage compartment through said treatment tank, means for conducting liquid from said one side of said second treatment compartment to said first treatment compartment, and means for regulating the flow of liquid from said other side of said second treatment compartment to said storage compartment at a rate determined by the level of liquid in said first treatment compartment.

References Cited in the file of this patent

UNITED STATES PATENTS

| 1,402,277 | Yoder | Jan. 3, 1922 |
| 2,378,799 | Sebald | June 19, 1945 |
| 2,379,753 | Sebald | July 3, 1945 |
| 2,500,774 | Sebald | Mar. 14, 1950 |
| 2,523,523 | Robinson et al. | Sept. 26, 1950 |
| 2,629,689 | Green et al. | Feb. 24, 1953 |
| 2,643,976 | Sebald | June 20, 1953 |
| 2,675,350 | Robinson | Apr. 13, 1954 |